2,912,463

1,1-BIS(2,5-DIALKYL-4-HYDROXYPHENYL) KETONES

David J. Beaver, Richmond Heights, Mo., and Richard O. Zerbe, Nitro, W. Va., assignors to Monsanto Chemical Company, St. Louis, Mo., a corporation of Delaware No Drawing. Original application October 26, 1951, Serial No. 253,474. Divided and this application December 16, 1957, Serial No. 702,779

3 Claims. (Cl. 260—590)

This invention relates to a new and novel family of 1,1-bis(2,5-dialkyl-4-hydroxyphenyl) ketones. More particularly, it relates to compounds derived by condensing pyruvic aldehyde with disubstituted phenols containing a polycarbon alkyl group in the 2-position and to their manufacture.

The new compounds may be represented by the general formula

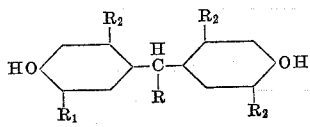

where

is the residue of pyruvic aldehyde, $R_1$ is a polycarbon alkyl group of at least four carbon atoms and $R_2$ is a lower alkyl group.

Dialkyl phenols suitable as starting materials for the preparation of the new compounds may be prepared by a variety of methods, however the position of the alkyl groups exerts a profound influence on the antioxidant properties and it is essential to employ phenols having the proper orientation of the alkyl groups. Exemplary of one suitable class of dialkyl phenols are the products prepared by alkylating a meta or 3-alkyl substituted phenol with a tertiary alcohol or olefin in the presence of sulfuric acid or phosphoric acid catalyst. This affords a convenient direct synthesis and the published evidence indicates that under these conditions the alkyl group enters the 6-position. In any event this class of products have proven to be satisfactory. Other methods of synthesis are equally well known and available for the introduction of normal alkyl groups. Examples of suitable dialkyl phenols together with their physical properties are listed below:

6-tert. butyl m-cresol, B.P. 130° C./20 mm.
2-tert. butyl 5-ethyl phenol, B.P. 135–138° C./20 mm.
6-tert. amyl m-cresol, B.P. 133–137° C./20 mm.
6-n-butyl m-cresol, B.P. 134° C./15 mm.
2-n-butyl 5-ethyl phenol, B.P. 119–121° C./4 mm.
6-isoamyl m-cresol, B.P. 104–106° C./2 mm.
6-n-hexyl m-cresol, B.P. 118–119° C./2.5 mm.
6-isohexyl m-cresol, B.P. 108–109° C./1.5 mm.
6-n-heptyl m-cresol, B.P. 126–128° C./2.5 mm.
6-n-octyl m-cresol, B.P. 141–143° C./3 mm.
6-n-decyl m-cresol, B.P. 146–147° C./2 mm.
6-n-dedecyl m-cresol, B.P. 183° C./3 mm. (M.P. 44° C.).

Still further examples of suitable 2,5-dialkyl phenols are 6-sec. butyl m-cresol, 6-(2,4-dimethyl butyl) m-cresol, 6-sec. amyl m-cresol, 6-sec. octyl m-cresol and 2,5-di-tert. butyl phenol.

The new compounds are antioxidants. The new compounds also comprise antiseptics and germicidal agents for which purpose the most effective compounds have been obtained from substituted aldehydes.

The condensation of the phenol and the aldehyde is usually carried out in a molar proportion of 2:1 in the presence of an acidic condensation catalyst, as for example, hydrochloric acid. Where desired solvents and/or dispersing mediums may be employed although the reactions are usually carried out in the absence of either. The following illustrates the preparation of the new compounds.

A half gram mole of the appropriate phenol and one-fourth gram mole of the aldehyde were refluxed in the presence of 4.7 grams of concentrated hydrochloric acid. The mixtures were refluxed at 95° C. The reaction times varied, these being determined by spot testing at intervals with a solvent or precipitant and quenching the reaction when crystal formation was observed and before sufficient resin was formed to interfere with purification of the crystals. The reaction mixture was cooled and thereto was added 100 ml. of benzene. The mass was stirred for 4 hours at 30–32° C. and the product filtered off, washed with several portions of the aforesaid hydrocarbon and dried. In this manner was obtained 1,1-bis-(5-tert. butyl-4-hydroxy-o-tolyl)-2-propanone, M.P. 196.2–197.1° C. (corr.). White solid, from pyruvic aldehyde and 6-tert. butyl m-cresol, reaction time 15 minutes. Carbon found 78.38%, calc. 78.50%. Hydrogen found 8.78%, calc. 8.96%.

As illustrative of the antioxidant properties of the new 1,1-bis(2,5-dialkyl-4-hydroxyphenyl) ketones duplicate rubber base stocks were compounded comprising:

| | Parts by weight |
|---|---|
| Pale crepe rubber | 100.0 |
| Zinc oxide | 60.0 |
| Lithopone | 20.0 |
| Sulfur | 2.0 |
| Diphenyl guanidine phthalate | 0.825 |
| Benzothiazyl thio benzoate | 0.675 |
| Paraffin | 0.25 |

To one base stock was added 1.0 part by weight of the antioxidant. The respective stocks were cured in the usual manner by heating in a press at 126° C. for 45 and 60 minutes. The first column of data in the following table shows the percent retention of ultimate tensile strength obtained after aging for 12 hours in an air bomb at 121° C. at 80 lbs./in.² The figures are the averages for the two cures. The second column shows the resistance to discoloration. Samples of the cured stocks were exposed under an S–1 sunlamp for 10 days. After exposure the light reflected from the surface of the stocks was measured by means of a photovolt reflectance meter calibrated against reflectance of standard MgO as 100%. The data shown are percent reflectance of the 60 minute cures.

Table I

| Antioxidant | Tensile Retained, Percent | Light Reflectance, Percent |
|---|---|---|
| None | 35 (av.) | 73 (av.) |
| 1,1-Bis (5-tert. butyl-4-hydroxy-o-tolyl)-2-propanone | 60 | 74 |

This application is a division of co-pending application Serial No. 253,474, filed October 26, 1951, which latter is a continuation-in-part of application Serial No. 159,128, filed April 29, 1950, now abandoned.

What is claimed is:

1. As a composition of matter a compound of the structure

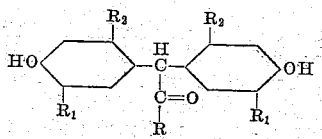

where R is a methyl group, $R_1$ is an alkyl group of 4–12 carbon atoms and $R_2$ is a lower alkyl group.

2. The method which comprises heating in the presence of an acidic condensation catalyst pyruvic aldehyde and a phenol of the structure

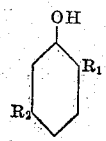

where $R_1$ is an alkyl group of 4–12 carbon atoms and $R_2$ is a lower alkyl group, with the elimination of water as a by-product of the condensation and terminating the reaction before resinous polymers are produced.

3. 1,1-bis (5-tert. butyl - 4 - hydroxy - o - tolyl) - 2-propanone.

References Cited in the file of this patent

UNITED STATES PATENTS 2,822,404     Ambelang _____ Feb. 4, 1958

OTHER REFERENCES

Harden et al.: J. Am. Chem. Soc., vol. 54, pp. 4325–34 (1932).